(12) United States Patent
Soni et al.

(10) Patent No.: US 7,681,638 B2
(45) Date of Patent: Mar. 23, 2010

(54) WELLBORE TREATMENT FOR REDUCING WAX DEPOSITS

(75) Inventors: Bhupendra Soni, Sugar Land, TX (US); Banwari Lal, Rajasthan (IN)

(73) Assignee: Glori Oil Limited, Houston, TX (US)

( * ) Notice: Subject to any disclaimer, the term of this patent is extended or adjusted under 35 U.S.C. 154(b) by 0 days.

(21) Appl. No.: 12/137,684

(22) Filed: Jun. 12, 2008

(65) Prior Publication Data
US 2009/0025931 A1 Jan. 29, 2009

Related U.S. Application Data

(60) Provisional application No. 60/944,236, filed on Jun. 15, 2007.

(51) Int. Cl.
*E21B 43/22* (2006.01)
(52) U.S. Cl. ........................ 166/246; 166/263; 166/304; 166/310; 166/312
(58) Field of Classification Search ........................ None
See application file for complete search history.

(56) References Cited

U.S. PATENT DOCUMENTS

2002/0066566 A1* 6/2002 Perriello ...................... 166/304
2006/0060350 A1* 3/2006 Hlatki et al. ............. 166/244.1

* cited by examiner

*Primary Examiner*—Zakiya W. Bates
(74) *Attorney, Agent, or Firm*—Conley Rose, P.C.

(57) ABSTRACT

A method of reducing wax deposition in an oil wellbore tubing includes providing an aqueous bioslurry comprising at least one microbe capable of degrading paraffin wax at about 20-45° C. and a nutrient medium containing one or more carbon source and an oxygen slow-releasing compound. The method further includes providing an oil wellbore completion having a production tubing with an interior surface including a zone that is susceptible to wax deposition when the well is operated to produce oil. The method further includes, while oil production from the well is stopped, incubating the biological slurry in the wax-deposition zone tubing for a sufficient time to multiply the microbe(s) and form a biofilm on at least the wax-susceptible zone.

16 Claims, 6 Drawing Sheets

WELLBORE TREATMENT FOR REDUCING WAX DEPOSITS

CROSS-REFERENCE TO RELATED APPLICATIONS

This application claims the benefit under 35 U.S.C. §119 (e) of U.S. Provisional Patent Application No. 60/944,236 filed Jun. 15, 2007, the disclosure of which is hereby incorporated herein by reference.

STATEMENT REGARDING FEDERALLY SPONSORED RESEARCH OR DEVELOPMENT

Not applicable.

TECHNICAL FIELD

The invention generally relates to processes for enhancing production of oil from oil wells, and more particularly to such processes which employ microbes to deter or remove paraffin wax deposits on wellbore tubing, surface wellheads, flow lines and well bore sumps to improve oil flow.

BACKGROUND

Paraffins are organic compounds which are a natural component of crude oil. They consist of various forms and combinations of aliphatic hydrocarbons and asphaltenes, form complex paraffins, and are characterized by their relatively high melting points and cloud points. At high temperatures, paraffinic crude oil flows freely through oil wells, wellbore tubulars and conduits carrying the oil. However, at temperatures below approximately 45° C. the paraffins begin to precipitate and form wax or paraffin deposits on the inner walls of the oil wellbore tubulars. These deposits grow thicker and more complex due to deposition of clay and corrosion products along with paraffins and asphaltenes. Eventually this buildup results in a significant narrowing or complete blockage of the oil wellbore tubulars, causing the crude oil flow through the wellbore tubulars to decrease markedly or to stop entirely. These paraffin deposits cause a loss of billions of dollars per year world wide due to the enormous cost of prevention and remediation, reduced or deferred production, well shut-in, pipeline replacements and/or abandonment, equipment failures, extra power requirement and increased man power needs.

Existing techniques for control of paraffin deposition in oil wellbore tubulars tend to be expensive and are plagued by a variety of problems. Hot water, chemicals and solvents that are customarily used to dissolve the paraffin deposits are costly, can be environmentally hazardous. In some instances wellbore tubulars have burst due to pressure build-up during a wax removal process. Periodic mechanical scraping of wellbore tubulars are commonly employed, however, those methods can require frequent shut downs of the well with associated production losses. Circulation of hot oil and hot water have also been employed, usually with only marginal success. There has been a great deal of activity in the field of preventing paraffin deposition and wax removal from the oil wellbores to deconstrict the oil wellbores and improve oil flow.

Currently, several methods and techniques are conventionally used for wax removal. These fall into three broad categories, the first of which includes temperature sensitive hot oil and hot water techniques. The second category includes mechanical scraping of the deposited wax, and the third category includes chemical methods. The hot oil technique for wax removal tends to be limited in applicability as it is usually effective only in the incipient stages of wax deposition. Hot oil treatment usually ceases to work in cases where wax deposition has already progressed and blocked the oil well. In situations where hot oil treatment alone is employed, the frequency of treatment is typically high in order to adequately control the wax buildup problem. The mechanical scraping of wax deposits from an oil wellbore is usually more time consuming than other methods, and also requires a shut down of the oil well for wax removal. The third category, chemical methods, typically involves the use of various surfactants and solvents. Aggressive blends of aromatic and/or aliphatic petroleum hydrocarbons or halogenated hydrocarbons, and water-based alkaline, hard-surface cleaners have been used for cleaning oil well buildups such as paraffin.

A fourth technique which has been suggested for decreasing wax buildup in oil well tubing involves the use of microbes. Some have proposed the use of bacteria to digest paraffinic and tar-based soils. The latter is said to be very dependent on well temperature and salinity and is sensitive to environmental factors such as the composition of the oil. Such bacteria-based solutions usually require that the well be shut down for several days to allow the establishment of a bacterial colony. When pumping resumes the bacteria are removed with the oil, which results in rapid depletion of the colony, thus necessitating repeated treatment. There is continued interest in developing ways to remove existing paraffin wax deposits from oil wellbore tubing and to prevent its deposition, in order to enhance oil recovery. Methods that minimize the need for shutting down production and that reduce the need for frequent retreatment are especially sought.

BRIEF SUMMARY

Compositions, systems and methods are disclosed that address the problem of paraffin wax deposition in oil wellbore tubing and in oil pipelines in a manner that is potentially more cost effective than most other methods. Certain mesophillic and thermophilic paraffin-degrading strains have been developed and employed in special compositions, processes and systems for eliminating or reducing paraffin deposition on the interior surfaces of oil pipelines.

In accordance with certain embodiments of the invention, a method of reducing paraffin wax deposition in a wellbore tubing of an oil well is provided. The method comprises a) providing an aqueous biological slurry comprising at least one microbe capable of degrading paraffin wax at a temperature in the range of approximately 20-45° C., and a nutrient medium containing at least one carbon source and a source of molecular oxygen ($O_2$); b) providing an oil wellbore completion comprising a production tubing having an interior surface comprising a region or zone that is susceptible or prone to paraffin wax deposition when the oil well is operated to produce oil. The method further comprises step c), while oil production from the oil well is stopped, the microbes in the biological slurry are incubated in at least the zone for a period of time sufficient to multiply the microbes and form a biofilm on at least the zone. In some embodiments, in step a), one or more microbes are isolated from a soil sample obtained from an earthen site where paraffin wax is undergoing degradation by indigenous microorganisms, or is the progeny thereof. In some embodiments, the paraffin degrading microbes are isolated from formation water instead of soil. For example, in some embodiments the microbes are derived from the indigenous formation water from the reservoir in which the wells to be treated are located.

In certain embodiments, at least one of the microbes is salt tolerant (e.g., *Halomonas Eurihalina*) and at least one of the microbes is a bacteria that grows in a lower salt environment (e.g., *Acinetobacter baumannii*). In some embodiments, at least one microbe capable of growing in subatmospheric oxygen concentrations is selected.

In certain embodiments, the oil wellbore completion further comprises (i) a bottom inlet in the production tubing, (ii) a formation surface, (iii) a wellbore, (iv) a casing, and (v) an annulus between the casing and tubing; and the method further comprises, prior to step c), $b_1$) introducing into the annulus and the oil producing formation in the near wellbore area a predetermined quantity of the biological slurry; and $b_2$) pumping the biological slurry up through the tubing from the bottom inlet to a point that is above the zone. In some embodiments, the formation is allowed to produce a sufficient amount of oil to displace the biological slurry up through the tubing.

In certain embodiments, the tubing in the oil wellbore completion targeted for treatment is cleaned to remove at least a portion of a preexisting paraffin wax deposit from the tubing.

In some embodiments, the source of $O_2$ in the nutrient medium comprises at least one oxygen-releasing compound. In some embodiments, the nutrient medium comprises minerals, sugars, organic solvents, vitamins, trace elements, a carbon source, an oxygen-releasing agent, an organic wax-solubilizing agent and water. For example, in some embodiments the nutrient medium is formulated by combining:

|  | Amount (g/L) |
|---|---|
| Bulk Chemicals | |
| $KH_2PO_4$ | 0.8-1.5 |
| $K_2HPO_4$ | 0.8-1.3 |
| Biosolve | 0.3-0.7 |
| Magnesium Peroxide | 0.01-1.0 |
| $MgSO_4$ | 0.3-0.8 |
| $NH_4Cl$ | 0.3-0.8 |
| $KNO_3$ | 0.3-0.8 |
| Trace Minerals | |
| Nitrilotriacetic acid | 10-20 |
| $MnSO_4$ | 3-7 |
| $FeSO_4 \cdot 7H_2O$ | 0.5-1.0 |
| $CoCl_2$ | 0.5-1.0 |
| $CaCl_2 \cdot 2H_2O$ | 0.5-1.0 |
| $ZnSO_4$ | 0.05-0.15 |
| $CuSO_4 \cdot 5H_2O$ | 0.01-0.02 |
| $AlK(SO_4)_2$ | 0.01-0.02 |
| $H_3BO_3$ | 0.01-0.02 |
| $Na_2MoO_4$ | 0.01-0.02 |
| Carbon Source: | |
| Glucose/Sucrose/Fructose | 1.0-10.0 |

In some embodiments, the wax deposition-susceptible region or zone has a temperature in the range of about 20-45° C. In some embodiments, in step a), providing the biological slurry includes $a_1$) taking an inoculum of the microbe(s) from a mother culture; $a_2$) activating the inoculum (e.g., incubating at about 30° C. for about 12-18 hours); $a_3$) serially multiplying the inoculum in a manner that excludes introduction of other microorganisms; and $a_4$) storing the resulting serially multiplied inoculum in a storage vessel that excludes introduction of other microorgamnsms.

In some embodiments, with respect to step c), the oil wellbore comprises a surface end and a formation end, and, incubating the microbes contained in the bioslurry includes closing the surface end of the oil wellbore during the incubation period, and incubating includes holding the slurry in the zone for about 1 to 10 days at a temperature in the range of about 20° C.-45° C., whereby an optimum growth stage is reached.

In some embodiments, after the incubation period, the method includes commencing operation of the oil well to produce oil at an improved flow rate. In some embodiments, an improved oil flow rate is maintained for a period of at least 6 months after commencing operation of the oil well after the incubation period, without ceasing production for periodic wax removal. In some embodiments, the proportion of $C_{14}$ to $C_{20}$ hydrocarbon in the resulting produced oil, relative to longer carbon chain hydrocarbons, is greater than that of oil produced by the well prior to performing the method.

In some embodiments an above-described method provides a combination of improved convenience and utility, which may include certain advantages of prior methods, and may overcome certain disadvantages or drawbacks of prior methods. Some embodiments make possible a potentially long term and cost effective solution to the problem of unwanted wax deposition in oil wellbores, thereby improving the oil flow. These and other embodiments, features and advantages will be apparent with reference to the following description and drawings.

DETAILED DESCRIPTION

A method is provided for reducing or preventing deposition and buildup of paraffin wax residues on oil wellbore tubing, oil pipelines and other equipment that has a surface which is susceptible to wax deposition when contacted by a paraffin-containing petroleum stream. "Paraffin wax" residues or deposits are sometimes referred to herein as simply "wax" or "paraffin." The method includes installing a biofilm on the wax deposit-prone surface of the oil wellbore tubing or other equipment. The biofilm is a mass of selected actively growing thermophilic and/or mesophilic microbes attached to polymer. For the purposes of this disclosure, a "mesophilic" organism is one that grows best in moderate temperature, neither too hot nor too cold, typically between 20 and 40° C. (68 and 104° F.). A "thermophilic" organism is an organism that thrives at relatively high temperatures, typically between 45 and 60° C. (113 and 144° F.)

Once the biofilm is formed, the bacteria enter a dormant stage where further proliferation is inhibited, the bacterial biofilm is sufficiently metabolically active to minimize wax deposition by degrading it through enzymatic action. In this manner, the sustained presence of microbial action on the exposed surface of the wellbore tubulars results in improved oil flow and fewer or no shut downs for wax removal. For the purposes of this disclosure, a bacteria or other microbe that is able to proliferate is considered to be "growing."

Figure 1:
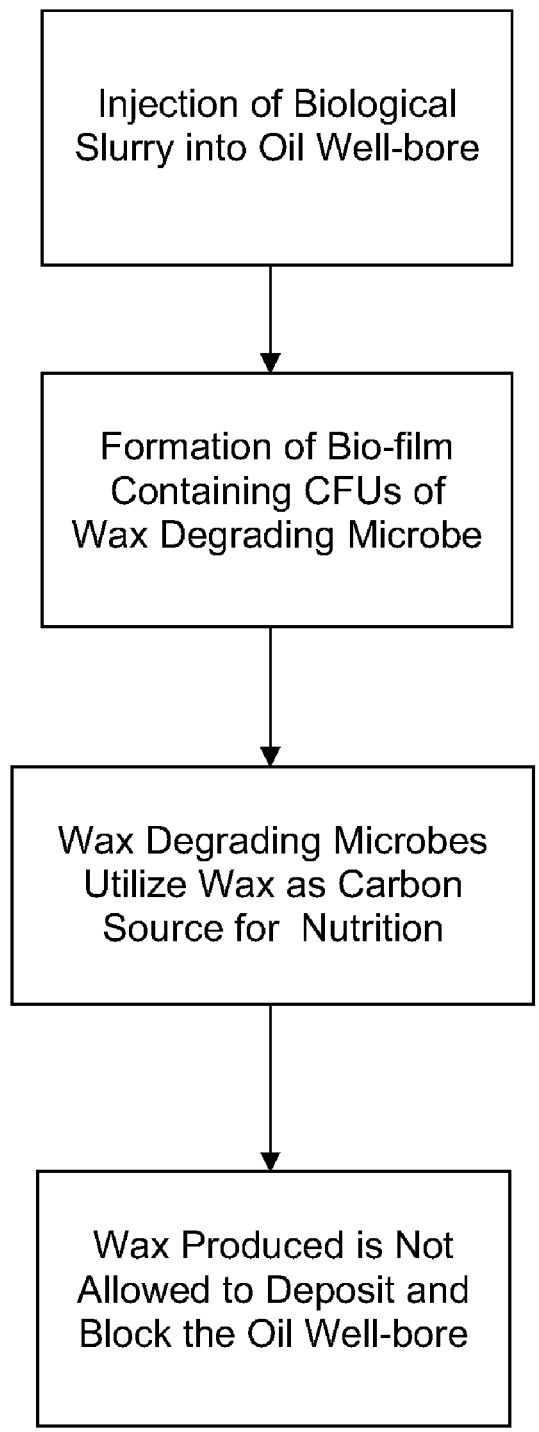
FIG. 1 is a schematic flow diagram illustrating the basic stages of a process for reducing the build-up of paraffin wax in an oil well and enhancing oil flow, in accordance with an embodiment of the invention.

FIG. 1 is a schematic flow diagram showing the basic sequential stages or steps of a process for enhancing oil production and/or reducing paraffin deposits in an oil wellbore tubular or an oil pipeline, or other piece of equipment. A representative process generally includes (1) injecting into an oil wellbore tubular or an oil pipeline a biological slurry ("bioslurry") containing selected wax-degrading microbes and nutrients; (2) forming a biofilm containing wax-degrading microbes on the interior surface of the tubing; (3) allowing the wax-degrading microbes to utilize paraffin/wax from the oil as a carbon source for nutrition; and (4) producing or transporting oil through the tubing, wherein paraffins that initially deposit on the biofilm are degraded by the microbes associated with the biofilm and are thereby removed from the interior of the tubing. Thus, the accumulation of deposited wax at susceptible areas of the tubing is reduced. Constriction within the tubing is thereby deterred or prevented, and blockage of the flow of oil through the tubing is postponed or avoided. For the purposes of this disclosure, the term "wellbore" refers to the hole produced when drilling an oil or gas well. A wellbore, sometimes also called a "borehole," includes the open hole or uncased portion of the well. In certain contexts, it may refer more particularly to the inside diameter of the wellbore wall or rock face that bounds the drilled hole.

Figure 2:
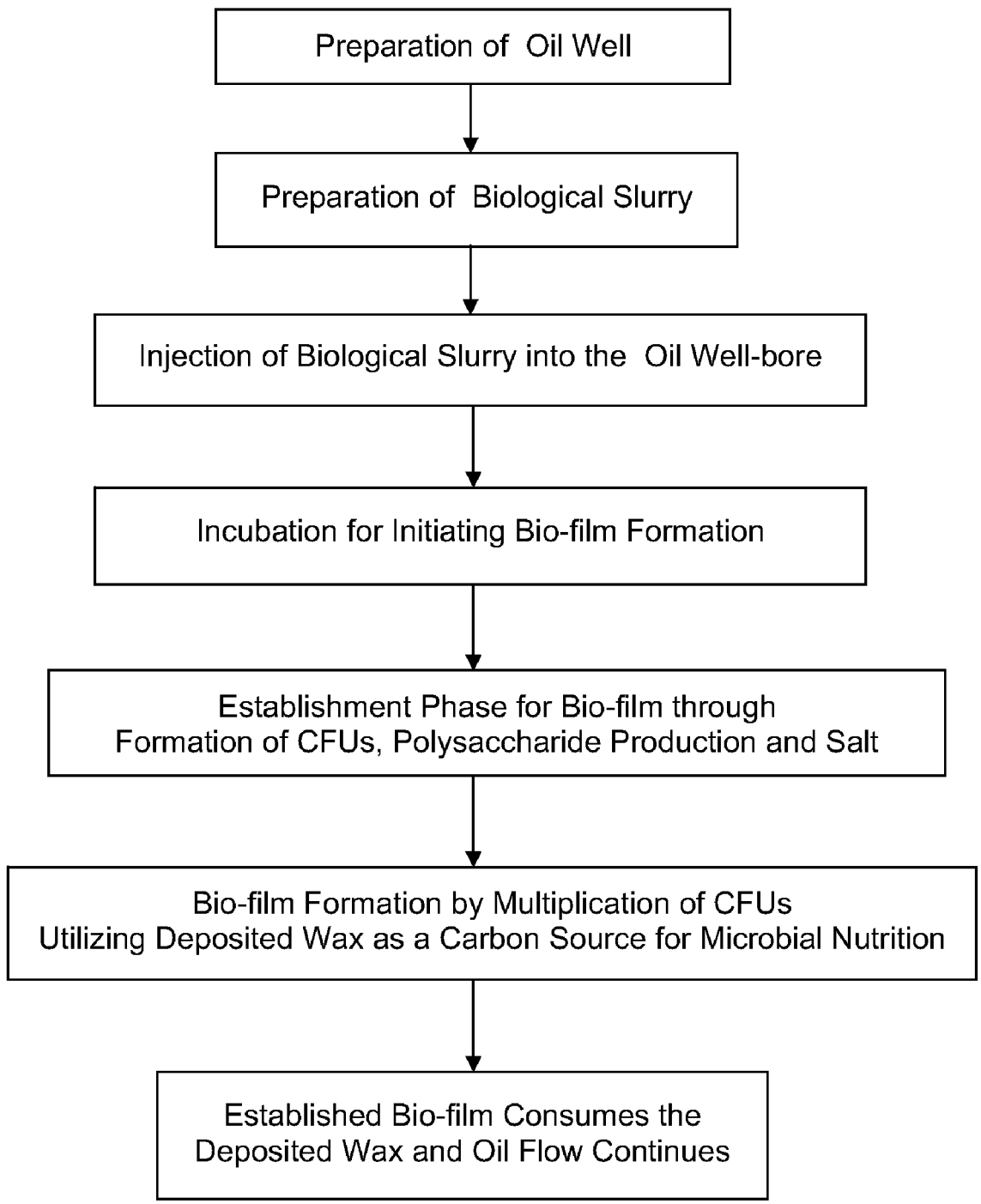
FIG. 2 is a schematic process flow diagram for treatment of an oil wellbore tubing incorporating the basic stages illustrated in FIG. 1.

In FIG. 2 a process flow diagram is shown which illustrates the steps of an oil wellbore tubing treatment that is based on the above-described steps or stages. In this process, (1) the subject oil well is prepared for treatment; (2) a special bioslurry containing wax-degrading microbes and nutrients is prepared; (3) the bioslurry is introduced into the oil wellbore; (4) the bacteria is incubated inside the wellbore to initiate biofilm formation on the tubing interior; (5) incubation is continued to establish the biofilm through action of bacteria; and (6) resuming or commencing oil flow over the established biofilm in the tubing, whereupon the microbes in the biofilm consume wax that deposits during continuing oil flow.

In some applications the oil tubing to be treated has no pre-existing layer of deposited wax. When this is the case, the carbon source for the microbes for initiating and establishing the biofilm is provided primarily by the sugars included in the bioslurry.

In other applications, prior to introduction of the bioslurry, the tubing has a small amount of deposited wax on its interior. In some cases, any pre-existing wax layer in the tubing is thin enough that the biofilm can form and adhere to the wax-coated areas of the tubing. In some applications in which a flow-constricting amount of wax is present, a suitable cleaning procedure is initially performed to reduce the existing deposits and improve the subsequent formation and adherence of the biofilm.

For treatment of oil well tubing to promote resistance to blockage by wax, the precise manner in which the bioslurry is made to contact the tubing surfaces that are susceptible to wax deposition during production may vary, depending on the particular geometry of the well to be treated. In general, the amount of the biological slurry injected is determined by the depth and the size of wellbore.

The bioslurry generally contains one or more bacteria or other microbes that are active at temperatures in the range of about 20° C. to at least about 70° C. and are capable of utilizing paraffin compounds as carbon source. In some embodiments, the selected microbes are also able to survive exposure to higher temperatures (e.g., at least 70-80° C.), which may be present in areas that the bioslurry might encounter downhole. For many situations of use, at least one of the selected microbes is also able to grow well in high salt conditions, such as 5% to 15% saline. In some applications, at least one of the selected microbes is able to grow well in low oxygen concentrations (e.g., subatmospheric levels), and are thus termed "microaerophilic" microbes.

In the bioslurry, the microbes are suspended in a special nutrient medium that, in some embodiments, includes oxygen-releasing compounds which are capable of degrading slowly to temporarily provide a sufficient amount of oxygen to support growth of the injected microbes in an anaerobic or low-oxygen environment, such as may exist in some areas of an oil well that is to be treated. In some embodiments, the nutrient medium also contains a buffering agent, nitrogen source, salts, vitamins, trace elements, a carbon source (e.g., fructose, sucrose, maltodextrin, glucose), a slow-releasing oxygen agent (e.g., calcium and/or magnesium peroxide), an organic wax-solubilizing agent and water.

After the bioslurry is injected into the annulus and the oil producing formation in the near wellbore area (e.g., at least the first 12 inches of the reservoir away from the wellbore) and is forced upward against gravity into the production tubing up to a level that covers the region or zone that is susceptible to wax deposition and blockage, the bacteria are allowed to grow, and to initiate and establish a biofilm on the tubing surface. In some embodiments, due to the slow release of oxygen from the oxygen releasing compounds in the nutrient medium, the initial growth, initiation, formation and establishment of the biofilm containing the selected microbes can take place regardless of whether the downhole environment is inherently aerobic or anaerobic. During the incubation period, which is usually in the range of 1 to 21 days, the oil well is shut-in. Alternatively, in some embodiments, the bioslurry is injected into the wellbore by pumping the bioslurry down through the production tubing into the wellbore, so that the areas susceptible to wax deposition are covered by the bioslurry.

Figure 3:
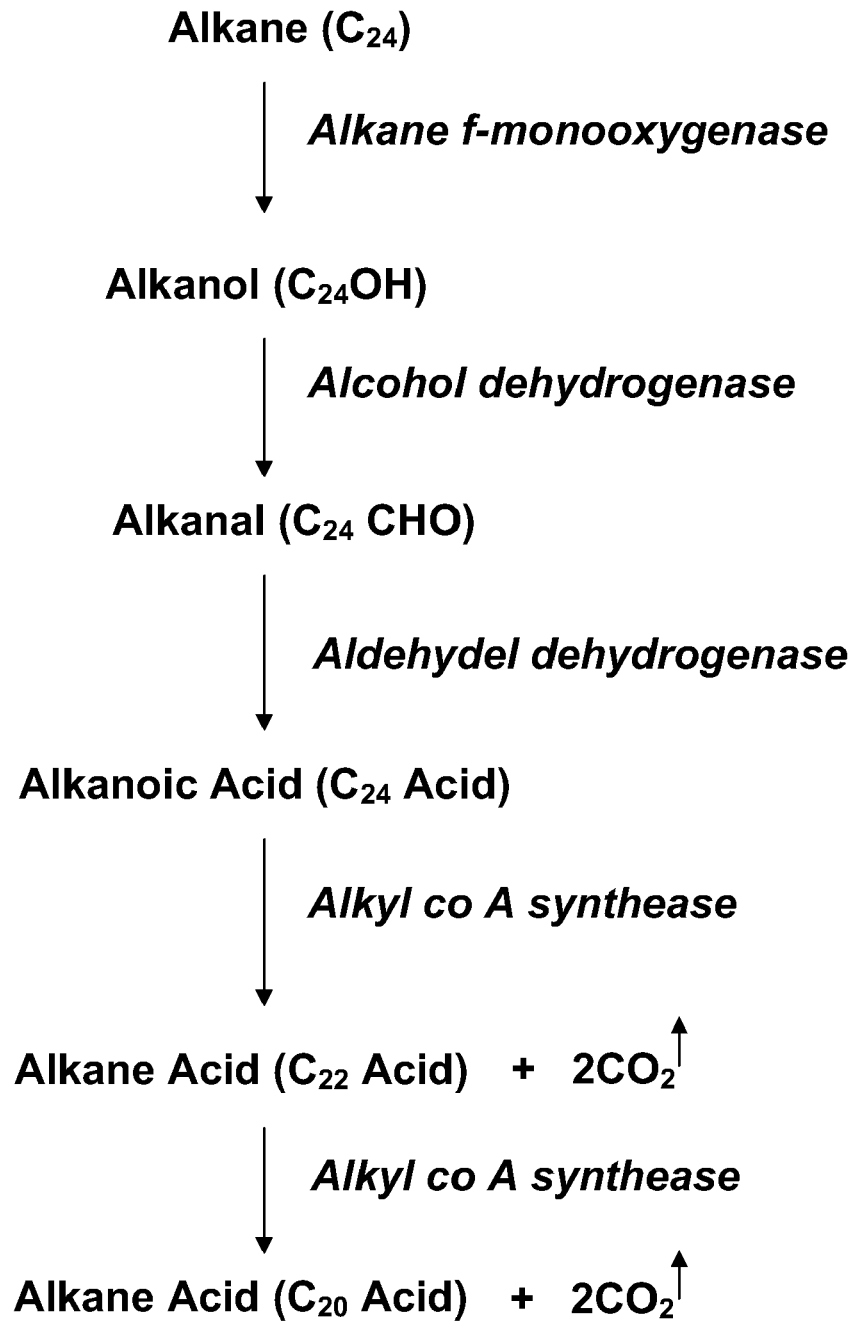
FIG. 3 is a flow diagram illustrating the alkane degradation pathway to convert longer chain paraffins to more desirable shorter chain molecules.

The known alkane degradation pathway associated with the selected wax-degrading microbes is shown in FIG. 3, using a $C_{24}$ alkane as a representative example of the paraffin wax molecules. On the biofilm-coated tubing, the wax degrading microbes are active for degrading paraffin wax to convert longer chain paraffins (e.g., $C_{24}$ to $C_{50}$ alkanes) to shorter alkanes, thereby increasing the amount of desirable $C_{14}$ to $C_{20}$ contained in the produced oil. The wax that would otherwise have ultimately been removed as blockage, considered oilfield waste, and would have required complicated clean-up and disposal procedures is, instead, advantageously converted by the selected microbes in the biofilm to desirable lower chain length alkanes in the oil.

Figure 4:
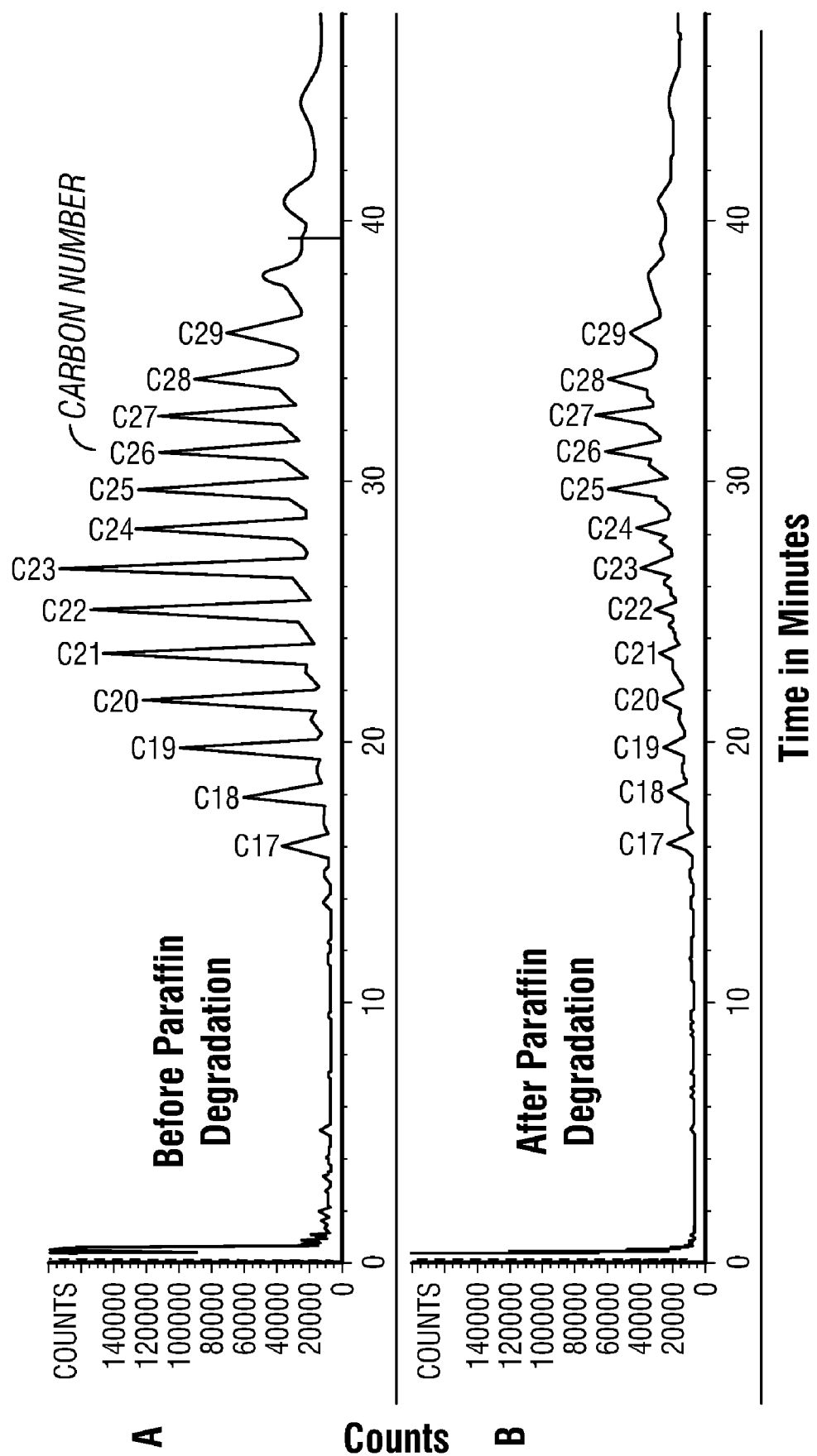
FIG. 4 is a pair of gas chromatograms showing the change in paraffin composition of a representative high paraffinic crude oil sample (provided by Glori Oil), after treatment in accordance with an embodiment of the invention. Panel A is a gas chromatogram showing the fingerprint of the sample prior to treatment as illustrated in FIG. 2. Panel B shows the fingerprint of the sample after treatment.
Figure 5:
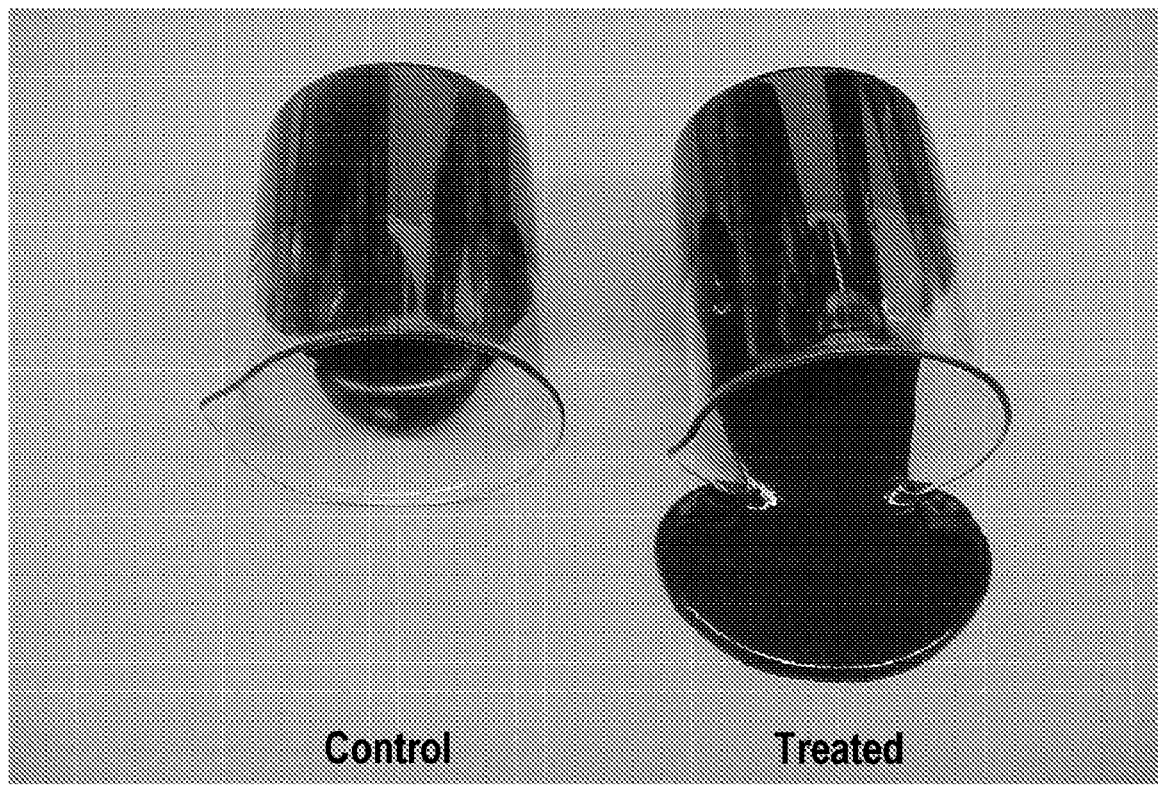
FIG. 5 is photograph demonstrating the difference in viscosity of a control oil sample (left) compared to a treated sample (right) that had been treated to degrade paraffins in accordance with an embodiment of the invention.

A representative sample of high paraffinic crude was analyzed by gas chromatography before and after treatment with the selected microbes. The quantification of degradation of paraffin comparative results are shown in FIG. 4. Panel A is a gas chromatogram showing the molecular "fingerprint" of the untreated sample. Panel B is a gas chromatogram showing the fingerprint of the treated sample. Distinct peaks representing $C_{14}$-$C_{36}$ alkanes are shown. In FIG. 5 the photographs of control and treated portions of a representative sample of high paraffinic crude oil the visible thinning effect of treatment (laboratory tests) with selected wax-degrading microbes is apparent. The control (untreated) sample on the left, and the treated sample on the right, clearly show that the viscosity of the treated sample is lower than that of the untreated sample. The decreased viscosity could be attributable to the reduced concentration of higher alkanes.

When production of a treated oil well commences or resumes, a significant portion of the microbial population is retained in the biofilm. The biofilm depresses the pour point of the oil, auxiliary tubing clean-out procedures are potentially facilitated by shifting any blockage due to wax deposition upward to a cooler, more accessible area in the tubing.

EXAMPLES

Example 1

Selection and Testing of Indigenous Wax-degrading Microbes

A systematic process was employed to obtain enrichment of superior wax degrading microbes, particularly thermophilic and mesophilic bacteria. Selected soil samples were taken from various depths ranging from about 1-4 ft below the surface at a site where paraffin wax from an oil well was undergoing natural degradation by indigenous microorganisms. The soil samples were mixed with nutrient media to obtain cultures. At least 59 different bacteria were initially identified in the enrichment. These and other bacteria were examined for their ability to degrade samples of wellbore wax by measuring the selective degradation of paraffin molecules primarily ranging from $C_{24}$ to $C_{32}$ carbon chains, to select the initial group of potentially useful cultures. Culturing at temperatures up to 45° C. was another primary criterion used for screening the cultures.

Next the selecting process focused on degradation kinetics to determine the best performing culture, out of the above mentioned sub-group of bacterial cultures, which is capable of degrading the maximum amount of paraffin. The microbes that showed better degradation kinetics and growth were selected and preserved for further use and testing. In subsequent screening, the growth rate was a key parameter for selecting a smaller sub-group of candidate cultures. The six candidate cultures were tested in media containing various nutrient mixtures, including testing at a salinity concentration of up to 13%. Nutrient mixtures that gave the best growth and paraffin degradation were selected for use in field applications. The metabolites produced by the selected bacteria include biosurfactant, biopolymer, acids and solvents. Polymer production by the bacteria helps to establish the biofilm on the formation face, well bore tubing and surface pipe lines used for production and transport of oil.

In one representative test, *Halomonas eurihalina* was selected, in part, for its ability to grow in high salt conditions, which is a common environment in many types of oil wells throughout the world. In the laboratory scale-up was to a 1200 L bioreactor. The resulting bacteria culture, along with a special nutrient mixture, was than delivered to the site of the oil well with wax deposition that was to be treated. The oil well was located adjacent to the site from which the original soil samples containing the indigenous microbes were taken. References herein to bacterial "growth" includes multiplication of the number of bacteria and metabolite production by the bacteria. An anaerobic zone is an area or region in an oil wellbore or oil transport tubing where the level of oxygen ($O_2$) is less than the normal level of oxygen that is present in the atmosphere.

The special nutrient media was prepared by combining the components listed in Table 1.

TABLE 1

Nutrient Media

| | Amount (g/L) |
|---|---|
| Bulk Chemicals | |
| $KH_2PO_4$ | 0.8-1.5 |
| $K_2HPO_4$ | 0.8-1.3 |
| Biosolve | 0.3-0.7 |
| Magnesium Peroxide | 0.01-1.0 |
| $MgSO_4$ | 0.3-0.8 |
| $NH_4Cl$ | 0.3-0.8 |
| $KNO_3$ | 0.3-0.8 |
| Trace Minerals | |
| Nitrilotriacetic acid | 10-20 |
| $MnSO_4$ | 3-7 |
| $FeSO_4 \cdot 7H_2O$ | 0.5-1.0 |
| $CoCl_2$ | 0.5-1.0 |
| $CaCl_2 \cdot 2H_2O$ | 0.5-1.0 |
| $ZnSO_4$ | 0.05-0.15 |
| $CuSO_4 \cdot 5H_2O$ | 0.01-0.02 |
| $AlK (SO_4)_2$ | 0.01-0.02 |
| $H_3BO_3$ | 0.01-0.02 |
| $Na_2MoO_4$ | 0.01-0.02 |
| Carbon Source: | |
| Glucose/Sucrose/Fructose | 1.0-10.0 |

The *Acinetobacter baumanii* and *Halomonas eurihalina* bacteria form biofilms which may be mixed or distinct structures on the tubing surfaces. Wax is also solubilized by microbial action so that wax deposition on the bottom hole of oil wells and on the wellbore tubulars is deterred or prevented. The large population of the selected bacteria in the injected slurry suppresses the indigenous microbial population in the oil well and minimizes the use of nutrients by a population of less beneficial microbes. The presence of the biofilm and the action of the bacteria will deter or prevent wax deposition and in so doing will also enhance oil flow though the well bore tubing.

The flow behavior of the bacteria-treated oil was tested using a drag point analyzer, which consists essentially of two flasks joined in series and maintained at a temperature of about 40° C. and 20° C., respectively. The flow of oil treated with the selected bacteria was not affected at the lower temperature (20° C.) indicating the robustness of the bacteria towards improving the flow characteristics of oil. Once the deconstriction of the oil wellbore has taken place it leads to an improved oil flow and because wax is not the limiting factor for the biofilm to function, in areas of the oil wellbore where wax is not available the microbial strength will be washed out by the production stream. Other oil wells with similar geological characteristics are expected to be similarly treatable.

Example 2

Deterring Constriction of Oil Flow Due to Wax Deposits

Medium and inoculum preparation. The selected *Acinetobacter baumanii* and *Halomonas eurihalina* bacterial strains are activated from a mother stock culture stored in −70° C. An ampoule of mother culture is initially thawed, and an inoculum taken from the mother culture was activated by holding it in ice for 3-4 hours. The bacterial culture is inoculated in 5 ml minimal salt medium (MSM) which had been previously autoclaved at 121° C. for 15 minutes, then cooled. Approximately 1 liter of MSM is prepared by addition of 0.9 g $KH_2PO_4$, 0.8 g $K_2HPO_4$, 0.3 g $MgSO_4$, 0.4 g $NH_4Cl$, and 0.6 g $KNO_3$ in 1000 ml distilled water. To this, 12 ml stock solution of trace minerals were added in quantities that were described in Example 1. Oil, sucrose or wax at a concentration of 0.1% to 1.0% was used as a carbon source. The bacterial culture is incubated in the MSM for 30-40 hours at 30-40° C. until optimal growth is achieved. A few tubes (2-5) are then transferred into 1 liter Luria Bertini broth medium and incubated at 30-40° C. for 20-40 hours, or until optimal growth is achieved.

Mass culture of the bacteria in fermentor. For bulk culture preparation of the selected paraffin-degrading bacteria 100-500 liters MSM containing glucose/sucrose (0.1%-1.0% w/v) as a carbon source is employed. The medium is sterilized by micro-filtration (0.2-0.4 micron filters). The 3-6 liter Luria Bertini broth medium (as described above) is used as the inoculum. The fermentation conditions in the fermentor vessel are maintained as follows: Temperature: 30-40° C.; Agitation: 50-200 rpm; Aeration: up to 0.5 vvm; pH: 7-8. Growth is periodically monitored until no further increase in optical density is observed. The resulting culture is used to prepare the biological slurry for injection in the oil well.

Preparation of biological slurry for inoculation in the well. A volume of 20,000-40,000 liters of defined growth medium is prepared in one or more tanks by mixing water and the desired amount of chemicals, as described above. A concentrated slurry of media is prepared in a smaller volume. Fresh non-chlorinated water is used for preparation of nutrient medium. The bacterial culture grown in the bioreactor as described above, containing *Acinetobacter baumanii* andn *Halomonas eurihalina* at an inoculum strength of up to 0.6%, is added to the nutrient mixture to form a bioslurry.

Inoculation of the biological slurry into test oil well. Any appreciable amount of deposited wax in the wellbore tubing of the selected oil well under test is removed before injection of the bioslurry. The bioslurry developed in the tanks is then injected into the oil wellbore under regulated pressure, using a slow injection rate (e.g., 2 barrel per minute injection) 80-90% of the bioslurry is used to displace the wellbore tubulars, to cover the area that is subject to wax deposition. The well is then closed for a period of time (e.g., 7 days) sufficient for development of a biofilm on the wellbore tubing/formation. The biofilm of the desired microbes is formed at the temperature optimal for its growth. The large population of the selected wax-degrading bacteria may tend to overtake and out compete any indigenous microorganisms in the treatment zone for nutrients, and may also degrade any available wax deposits on which the biofilm is able to establish itself.

Once the biofilm is formed, it will cause dissociation and degradation of the wax particles, according to the representative alkane degradation pathway of a $C_{24}$ alkane shown in FIG. 3. Upon resuming oil flow, the biofilm prevents wax deposition in the vulnerable <45° C. region, where condensation of the liquid wax components of the oil commences. Thus, the presence of the biofilm and the wax-degrading bacteria provide enhanced oil flow though the oil bore tubing and deter constriction of the pipe by wax deposits in the vulnerable region.

The *Acinetobacter baumanii* and *Halomonas eurihalina* wax-degrading bacteria described herein are considered to be representative of other microbial assemblages that can be selected using similar procedures. Such other, similarly selected bacteria, comprising other bacteria that are classified as thermophilic or mesophilic bacteria are expected to have similar wax-degrading properties suitable for removing paraffin wax from oil well tubing and/or for deterring buildup of wax deposits and for effecting pour point depression of produced oil from a well. Thus, the methods described herein are applicable to a wide variety of oil wells in various types of rock formations with differing geologic properties and different indigenous microbe consortia.

Example 3

Preparation of Bioslurry for Treating an Oil Wellbore

A bioslurry is prepared as follows, taking care at each stage to use sterile technique in order to avoid contamination and introduction of any undesired microbes:
 a) providing an inoculum by thawing a mother culture of one or more selected microbes, originally stored at −70° C., or taking a portion of the thawed mother culture, and holding the mother culture or portion thereof (the "inoculum") at about 0° C. for about 3-4 hours, to activate the microbes;
 b) serially multiplying the activated inoculum by
  i) injecting 0.1 ml of the activated inoculum in each of several test tubes (e.g., 5-20) test tubes containing 5.0 ml of the growth culture medium and incubating the test tubes at a temperature in the range of 30-40° C. for a period of 1-3 days, whereby an optimum growth rate is reached;
  ii) injecting 20 ml of the culture from step (i) into each of the several flasks each containing 1 liter of the growth culture medium and incubating the vessel at a temperature of 30-40° C. for a period of 1-3 days, whereby an optimum growth rate is reached; and
  iii) transferring 3-6 liters of the culture from step into a bioreactor containing 100-400 liter of the growth culture medium and incubating the mixture at a temperature of 30-40° C. for a period of 1-3 days, whereby an optimum growth rate is reached.

The "optimum growth rate" is a stage at which the optical density of greater than 0.6 is achieved. Maintaining aseptic handling and transfer techniques includes filling of the various vessels, tanks and bioreactors with water, adding of the growth culture medium, and sterilizing the medium by membrane filtration.

Example 4

Generation of a Wax-degrading Biofilm

A biofilm capable of degrading wax deposits in an oil wellbore tubing/formation is typically generated by carrying out the following procedure:
 a) Injecting the bioslurry into the oil wellbore casing/tubing annulus, as described in Example 2, and then closing the surface end of the oil wellbore. The volume of bioslurry required is determined from the depth and size oil wellbore;
 b) Allowing the injected biological slurry to serve as a bioreactor for a sufficient period of time to initiate, form and establish a biofilm containing the selected microbes at a temperature in the range of 20° C.-70° C. In general, the length of incubation is in the range of 1 to 10 days. In some applications, a 7 day incubation period is adequate. During the incubation period the wax-degrading microbes in the bioslurry multiply and reach an optimum growth stage in situ and form a biofilm on at least on the interior surface of the tubing at the location where wax deposition during production operation is expected. In some situations, a wax deposit or residue is on the tubing initially when the biofilm is formed. The microbes contained in the biofilm draw their carbon requirements from the deposited wax and produce alcohols and acids which further solubilize any wax deposits. The well is shut in during the incubation period.

c) The well is returned to production after the incubation period. Production is accomplished either through natural flow or by applying a combination of sucker rod pumps, gas-lift or electrical submersible pumps, or any other suitable pumping means to the tubing. A small portion of the microbial population in the bioslurry is washed out by the flowing oil; however, the microbes that are associated with the biofilm remain on the surface of the tubing/rock grains where they survive in accordance with the available wax.

Example 5

Microbial Paraffin Treatment in an Oil Well of a Texas Panhandle Field

The characteristics of a representative high paraffinic treatment well located in the Panhandle region of Texas are summarized in Table 2.

TABLE 2

| Oil Well Properties | |
|---|---|
| Type of Formation | Dolomite |
| Drilled depth | 3000 Feet |
| Drilled Hole Diameter | 12 Inches |
| Casing Depth | 2700 Feet |
| Casing Diameter | 7 Inches |
| Zone Height | 300 Feet (2700-3000 ft) |
| Tubing Diameter | 2 Inches |
| Oil Production Rate | 0.5 to 6 BBls/day |
| Water Cut | 50% |
| Gas Production | 10 to 20,000 cu ft/day |
| Oil Quality | Waxy |
| Depth of Wax Deposition | Bottom To 1000 Ft. |
| Bottom Temperature | 85-90° F. |
| Salt concentration | Chloride: 80,000 ppm |
| Carbon Black | Present (in free form) |
| Iron content in water | High |
| Reservoir Pressure | 50 Psi |

Figure 6:
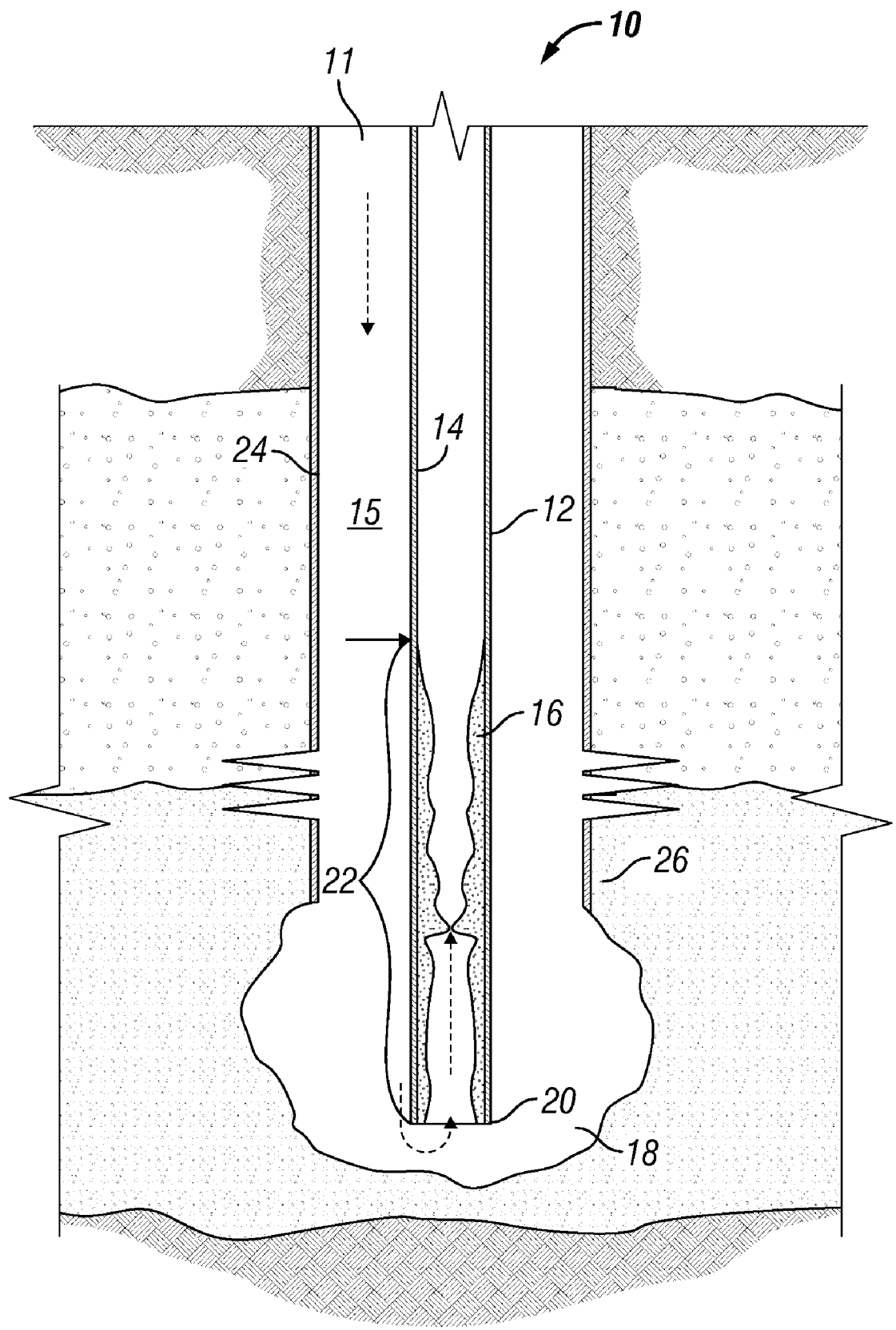
FIG. 6 is a conceptual illustration of a typical Texas Panhandle wellbore completion for treatment by the process of FIG. 1, in accordance with an embodiment of the invention.

FIG. 6 is a diagram (not drawn to scale) of a typical Texas Panhandle wellbore completion prior to injection of a bioslurry, which is prepared as described above. A layer of wax 16 that has deposited on the interior surface 14 of the approximately lower one-third of the production tubing 12 is shown. The dashed arrows show the direction of flow of the bioslurry as it is injected at the wellbore surface 11 and flows down through the annulus 15 between casing 24 and production tubing 12, fills the formation sump 18 around the bottom 20 of the production tubing 12, and pumped upward through tubing 12 until at least the vulnerable portion or zone 22 of surface 14 is covered by the treatment bioslurry. The small arrow indicates the fill point in tubing 12 where at least the vulnerable portion 22 is covered by the bioslurry. In this type of well completion configuration the bottom 20 of the wellbore comprises an enlarged area or sump 18, as may result from setting off an explosive material to fracture a rock formation after cessation of drilling. The bioslurry also goes into the near wellbore region 26. The volume of bioslurry required for treatment of this type of well is determined by the depth and estimated hole size of the wellbore.

Nine wells were treated in this same reservoir, each of which having the properties described in Table 2. Prior to treatment, these wells were in production and were being cleaned every two to four weeks to remove wax deposits. At the beginning of the present tests, four of the wells were pre-cleaned using hot water/steam, and five were not pre-cleaned. The volume of the above-described bioslurry injected into each well was in the range of about 100 to about 150 barrels. The wells were monitored for production up to nine months after treatment. The production fluid was examined in the first few weeks and showed bacteria population in the fluid. None of the nine treated wells required any periodic cleaning during the post-treatment monitoring period. It is concluded that a biofilm as described above was deposited in vulnerable areas within the tubing which resulted in the desired degradation of paraffin.

Although particular exemplary embodiments of the invention have been disclosed in detail for illustrative purposes, it will be recognized to those skilled in the art that numerous variations or modifications of the methods for wax degradation and deterring constriction of oil wellbores are possible. The methods are not in anyway confined or restricted to preventing or removing wax deposition in a particular oil well only. Depending on the particular needs and circumstances, application of the present compositions, apparatus and methods may be extended to uses other than oil wellbore tubing, surface wellheads and flow lines. As will be evident to those skilled in the art, the use of microbial means for decongesting of oil passages that are constricted by wax deposits, or prone to such constriction, may also be used in combination with other technologies directed toward addressing the problem of paraffin wax deposition in oil wells or premature closure of oil wells due to paraffin blockage. Accordingly, the invention is intended to embrace all such alterations, modifications and variations as may fall within the spirit and scope of the invention. What is claimed is:

What is claimed is:

1. A method of reducing wax deposition in a wellbore tubing of an oil well, the method comprising:
 a) providing an aqueous biological slurry comprising at least one microbe capable of degrading paraffin wax at a temperature in the range of about 20-45° C., and a nutrient medium comprising at least one carbon source selected from the group consisting of glucose, sucrose and fructose, an oxygen slow-releasing compound selected from the group consisting of calcium peroxide or magnesium peroxide, and other components including minerals, organic solvents, vitamins, trace elements, an organic wax-solubilizing agent and water;
 b) providing an oil wellbore completion comprising a production tubing having an interior surface comprising a zone that is susceptible to paraffin wax deposition when the oil well is operated to produce oil;
 c) while oil production from the oil well is stopped, incubating said biological slurry in said zone for a period of time sufficient to multiply said at least one microbe and form a biofilm on at least said zone.

2. The method of claim 1 wherein, in a), said at least one microbe is isolated from a soil sample obtained from an earthen site where paraffin wax is undergoing degradation by indigenous microorganisms, or is the progeny thereof.

3. The method of claim 1, wherein in a), said at least one microbe is isolated from the formation water of an oil well.

4. The method of claim 1, wherein, in a), providing said aqueous biological slurry includes selecting at least one salt-tolerant microbe and selecting at least one microbe that grows in a lower salt environment.

5. The method of claim 1, wherein said at least one microbe comprises *Halomonas eurihalina*.

6. The method of claim 1, wherein said at least one microbe comprises *Acinetobacter baumanil*.

7. The method of claim 1, wherein, in a), providing said aqueous biological slurry comprises selecting at least one microbe capable of growing in subatmospheric oxygen concentrations.

8. The method of claim 1, wherein in b), said oil wellbore completion further comprises (i) a bottom inlet in said production tubing, (ii) a formation surface, (iii) a wellbore, (iv) a casing, and (v) an annulus between the casing and tubing; and wherein the method further comprises, prior to c):
   $b_1$) introducing into the annulus and the oil producing formation in the near wellbore area a predetermined quantity of the biological slurry; and
   $b_2$) pumping the biological slurry up through the tubing from the bottom inlet to a point that is above said zone.

9. The method of claim 1, wherein in (b), providing said oil wellbore completion comprises cleaning the wellbore tubing to remove at least a portion of a preexisting paraffin wax deposit from the tubing.

10. The method of claim 1, wherein said zone has a temperature in the range of about 20-45° C.

11. The method of claim 1, wherein step a) comprises:
   $a_1$) taking an inoculum of said at least one microbe from a mother culture;
   $a_2$) activating said inoculum
   $a_3$) serially multiplying said inoculum in a manner that excludes introduction of other microorganisms; and
   $a_4$) storing the resulting serially multiplied inoculum in a storage vessel that excludes introduction of other microorganisms.

12. The method of claim 1, wherein said oil wellbore comprises a surface end and a formation end, and, in c), said incubating comprises closing the surface end of the oil wellbore during said incubation period, and said incubating comprises an incubation period of about 1 to 10 days at a temperature in the range of about 20-45° C. whereby an optimum growth stage is reached.

13. The method of claim 1, further comprising, after said incubation period, commencing operation of said oil well to produce oil at an improved flow rate, wherein the wax-degrading microbes utilize paraffin/wax from the oil as a carbon source for nutrition during operation of said oil well.

14. The method of claim 13, further comprising maintaining an improved oil flow rate for a period of at least six months after said commencing of operation of the oil well, without ceasing production for periodic wax removal.

15. The method of claim 13, wherein the proportion of $C_{14}$ to $C_{20}$ hydrocarbon molecules in the resulting produced oil, relative to longer carbon chain hydrocarbon molecules, is greater than that of oil produced by said well prior to performing said method.

16. The method of claim 1, wherein the nutrient medium comprises 1.0-10.0 g/L of said Glucose, Sucrose or Fructose, 0.8-1.5 g/L $KH_2PO_4$, 0.8-1.3 g/L $K_2HPO_4$, 0.01-1.0 g/L Magnesium Peroxide, 0.3-0.8 g/L $MgSO_4$, 0.3-0.8 g/L $NH_4Cl$, 0.3-0.8 g/L $KNO_3$, 10-20 mg/L Nitrilotriacetic acid, 3-7 mg/L $MnSO_4$, 0.5-1.0 mg/L $FeSO_4.7H_2O$, 0.5-1.0 mg/L $CoCl_2$, 0.5-1.0 mg/L $CaCl_2.2H_2O$, 0.05-0.15 mg/L $ZnSO_4$, 0.01-0.02 mg/L $CuSO_4.5H_2O$, 0.01-0.02 mg/L $AlK(SO_4)_2$, 0.01-0.02 mg/L $H_3BO_3$ and 0.01-0.02 mg/L $Na_2MoO_4$.

* * * * *